US007272319B1

(12) United States Patent
Piccirilli et al.

(10) Patent No.: US 7,272,319 B1
(45) Date of Patent: Sep. 18, 2007

(54) SYSTEM AND METHOD FOR SECURE MULTIPLE WAVELENGTH COMMUNICATION ON OPTICAL FIBERS

(75) Inventors: Alfonso B. Piccirilli, Greenbrook, NJ (US); Herman Melvin Presby, Highland Park, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/262,530

(22) Filed: Mar. 4, 1999

(51) Int. Cl.
 *H04B 10/00* (2006.01)
(52) U.S. Cl. ........................................ 398/89; 398/182
(58) Field of Classification Search ................ 359/124, 359/159, 135, 136, 158; 398/78, 182–201, 398/89, 99
 See application file for complete search history.

(56) References Cited

U.S. PATENT DOCUMENTS

| 4,100,374 | A | | 7/1978 | Jayant et al. | |
|---|---|---|---|---|---|
| 5,394,489 | A | | 2/1995 | Koch | |
| 5,495,356 | A | | 2/1996 | Sharony et al. | |
| 5,589,967 | A | | 12/1996 | Auffret | |
| 5,677,778 | A | | 10/1997 | Kanterakis et al. | |
| 5,710,650 | A | * | 1/1998 | Dugan | 398/91 |
| 6,025,944 | A | * | 2/2000 | Mendez et al. | 398/78 |
| 6,160,651 | A | * | 12/2000 | Chang et al. | 398/79 |
| 6,256,124 | B1 | * | 7/2001 | Hait | 398/9 |
| 6,356,371 | B1 | | 3/2002 | Chiaroni et al. | |
| 2002/0018261 | A1 | * | 2/2002 | Takeguchi et al. | 359/124 |

FOREIGN PATENT DOCUMENTS

| CA | 2239820 | 12/1998 |
|---|---|---|
| EP | 1 061 685 A2 | 12/2000 |
| EP | 00 30 1382 | 4/2005 |
| JP | 03-169137 | 7/1991 |
| WO | WO 00/01097 | 1/2000 |

OTHER PUBLICATIONS

Norte, D. Demonstration of an All-Optical Data Format Transparent WDM-to-TDM Network Node with Extinction Ratio Enhancement for Reconfigurable WDM Networks, IEEE 1995.*
Norte, D. "All-Optical TDM-to-WDM Data Format Conversion in a Dynamically Reconfigurable WDM Network." IEEE 1996.*
Norte, D. Demonstration of an All-Optical Data Format Transparent WDM-to-TDM Network Node with Extinction Ratio Enhancement for Reconfigurable WDM Networks, IEEE 1995☐☐.*
N.K. Dutta, et al., "Fabrication and performance characteristics of buried-facet optical amplifiers", *J. Appl. Phys.* 67(9), p. 3943 (1990).
T. L. Koch, et al., "Semiconductor Photonic Integrated Circuits", *IEEE Journal of Quantum Electronics* vol. 27, No. 3, p. 641 (1991)
Y. Tanaka et al., "Optical Parallel Transmission with Multi-Wavelength for High Speed Communications on Indoor Channels," IEICE Trans. Commun., vol. E81-b, No. 4, pp. 729-736, Apr. 1998.

* cited by examiner

*Primary Examiner*—Agustin Bello

(57) ABSTRACT

A method of optical communication having improved security is described. The data content of an initially provided data signal is apportioned among two or more distinct optical wavelength channels. A transmitted signal spans these two or more channels. A respective portion of the data content of the transmitted signal is allocated to each of the optical wavelength channels. In certain embodiments of the invention, each such portion comprises data placed in the pertinent wavelength channel during assigned time windows.

32 Claims, 5 Drawing Sheets

US 7,272,319 B1

SYSTEM AND METHOD FOR SECURE MULTIPLE WAVELENGTH COMMUNICATION ON OPTICAL FIBERS

FIELD OF THE INVENTION

This invention relates to methods of communication in which signals at multiple wavelengths are multiplexed onto a single optical fiber.

ART BACKGROUND

Optical fibers are rapidly becoming ubiquitous as a communication medium. One reason for the growing popularity of optical fibers is advancement in the ability to multiplex many wavelength channels onto a single fiber, and particularly onto a single-mode fiber, which has the advantageous property of relatively low dispersion. For example, dense Wavelength Division Multiplexer (WDM) equipment is now commercially available for multiplexing eighty or more wavelength channels onto a fiber.

WDM technology, together with design of low-dispersion fiber and of fast optical sources and detectors, has advanced so far that 10 Gibabits per second are now readily transmitted over a single fiber using commercial technology, and hundreds, or even thousands, of Gigabits per second can be transmitted using experimental technology.

With the rapid rise in transmission capacity, there has come a concomitant need for protection of sensitive information being transmitted. Although encryption algorithms are available, there are certain drawbacks to their use. For example, they occupy extra bandwidth to a generally inflexible degree, they demand the use of data-processing equipment at the sending and receiving ends for encryption and decryption, respectively, they may involve complicated protocols, and key exchange may be attended by stringent concerns for security.

Thus, it would be useful to provide an alternative to conventional methods of encryption. In particular, it would be useful to have a data-protection technique that is inherently secure against interception of signals, irrespective of whether the transmitted messages are encrypted.

SUMMARY OF THE INVENTION

We have provided such a technique. In accordance with our technique, a bit stream constituting a message to be transmitted is divided into portions, and these portions are allocated among plural wavelength channels for transmission. Thus, each portion is transmitted in one assigned wavelength channel, but different portions may be transmitted in different channels. As a consequence, successful reception of the original message requires both the ability to receive over the full set of wavelength channels used for transmission, and knowledge of the pattern of channel allocations, so that the portions can be reconstituted in the proper order. Security is enhanced because neither of these requirements is easily satisfied in an unauthorized interception of the transmitted signal.

Various embodiments of the invention, using different technological approaches, are contemplated. For example, in electronic approaches, the original message is divided into portions while in electronic form, and the portions are sent to respective optically emissive devices according to their assigned wavelength channels. By contrast, in electro-optical approaches, the electronic bit stream corresponding to the original message is used to modulate the output amplitude of an electronically tunable emissive device, while channel assignments are made directly by a separate tuning signal that controls the output wavelength. By further contrast, in optical approaches, an original optical carrier is shifted into selectable wavelength channels by non-linear mixing.

Exemplary implementations of each of these approaches are described below.

DETAILED DESCRIPTION

Figure 1:
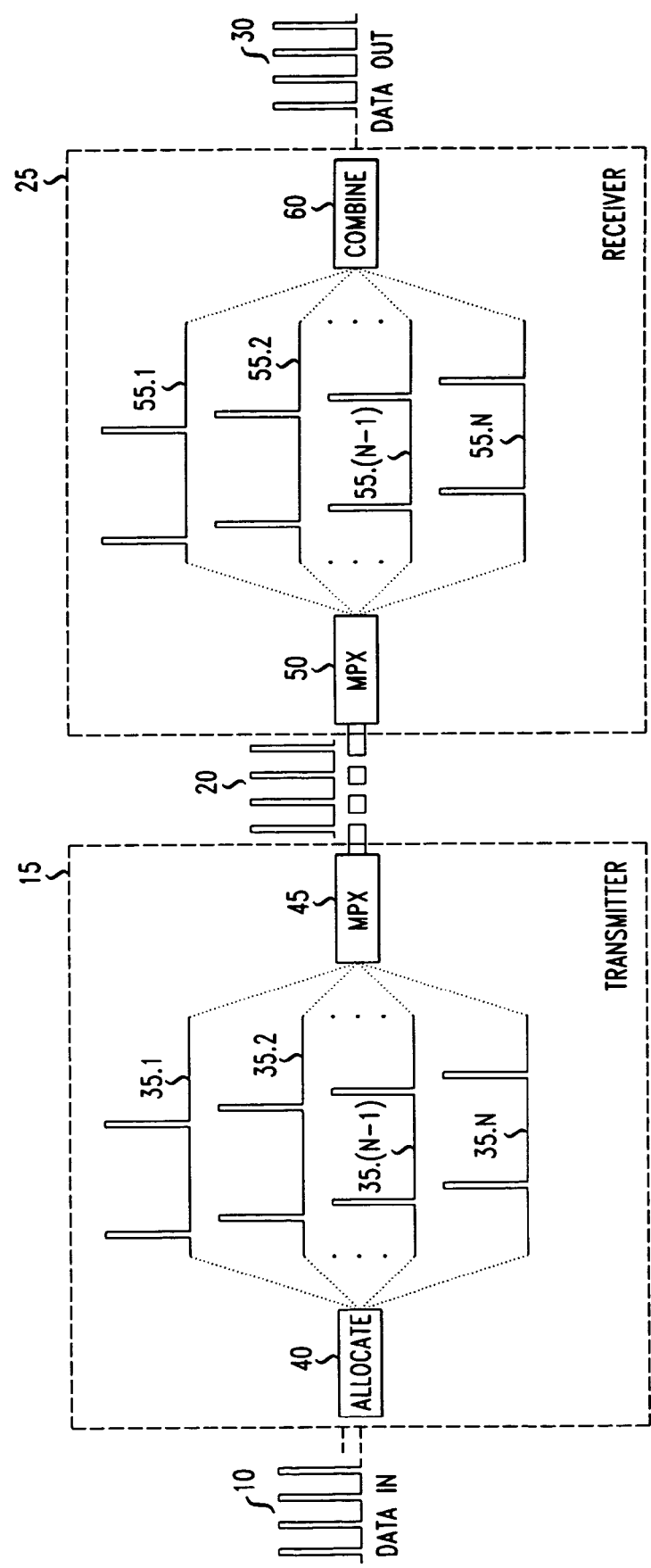
FIG. 1 is a conceptual block diagram of a wavelength-coding communication system according to the invention in a broad aspect.

FIG. 1 shows the general features of a wavelength-coding system according to the invention. For simplicity of presentation, data stream 10 is shown in the figure as occupying a single optical or electronic channel. This is not meant to be limiting, however. Those skilled in the art will appreciate that multiple channels are readily accommodated, using, e.g., standard multiplexing techniques, without deviating from the spirit of the invention.

Data stream 10 is processed within transmitter 15 to produce transmitted signal 20, which is made up of wavelength-coded data. Signal 20 is received and decoded by receiver 25 to produce recovered data stream 30.

Within transmitter 15, portions 35.1 of the input data stream are allocated to a first wavelength channel, portions 35.2 are allocated to a second wavelength channel, and so forth up to the allocation of portions 35.N to some highest numbered channel N. As will be discussed in greater length below, this allocation is made in accordance with time windows assigned to the respective wavelength channels. In the figure, the channel-allocation function is represented by element 40. A further function of the transmitter, represented by element 45, is the multiplexing of the allocated portions, which now span N wavelength channels, into the single output data stream 20.

Output data stream 20 will typically be launched into an optical fiber. However, data stream 20 may alternatively be launched into, and received from, free space without departing from the principles of the present invention.

At receiver 25, data stream 20 is received and demultiplexed (as represented by functional element 50), to produce separate portions 55.1, 55.2, ..., 55.N of the data stream. These portions are combined, as represented by element 60, into output data stream 30 which, in keeping with the present illustrative case, occupies a single optical or electronic channel.

Figure 2:
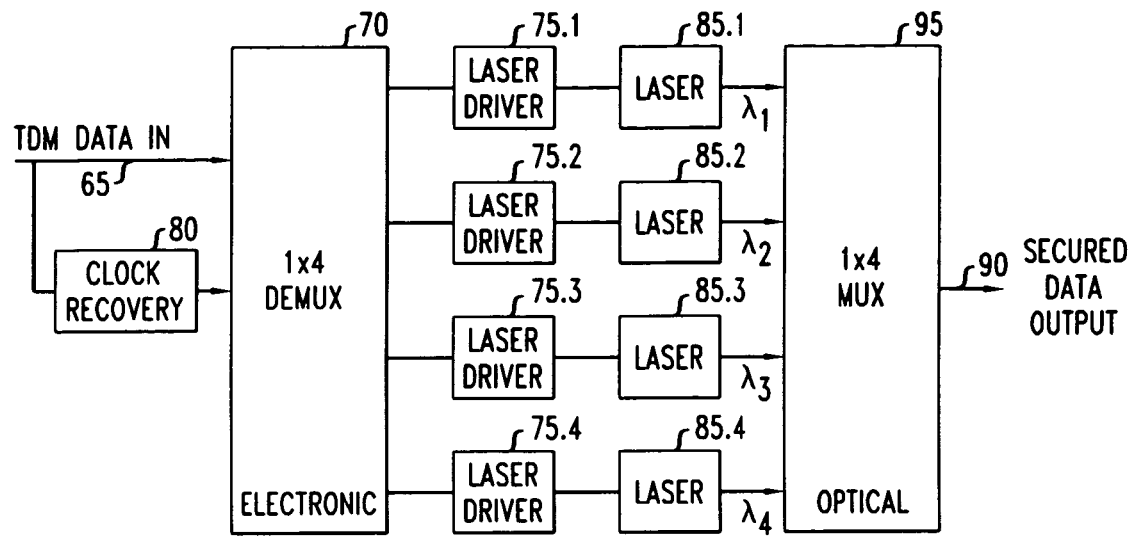
FIG. 2 is a conceptual block diagram of an electronic wavelength-coding system according to the invention in one aspect.

In the electronic approach to wavelength coding, a data stream in the electrical domain is coded by electronic time-division multiplexing (TDM) techniques. For example, turning to the illustrative four-wavelength system of FIG. 2, input data stream 65 is processed by electronic 1×4 demultiplexer 70 to provide respective drive signals for laser drivers 75.1-75.4. Timing element 80 provides the clock signal for the demultiplexer and the coding information needed for demultiplexing.

If input signal 65 is received in optical form, it is readily converted by an optical receiver (not shown) to electronic signal format. Optical receivers are readily available that will also generate the clock signal for the 1×4 demultiplexer. In this context, timing element 80 should be understood as symbolically representing the sources of the coding information and the clock signal.

Each of the laser drivers converts its allocated portion of the data stream to the optical domain by driving its respective one of lasers 85.1-85.4, which emit in respective wavelength channels identified by wavelengths $\lambda_1$-$\lambda_4$. These optical data streams are combined onto, e.g., a single optical fiber 90 by optical 1×4 multiplexer 95.

Those skilled in the art will appreciate that although we have described coding using four wavelengths, either fewer or more wavelengths may be used. In fact, the number of wavelengths that may be used for coding is limited only by the capacities of the transmission media and signal-processing equipment.

It should be noted in this regard that one commercially available element useful as multiplexer 95 is the 1450D Dragone dense wavelength division multiplexer, available from Lucent Technologies Inc., 600 Mountain Avenue, Murray Hill, N.J. 07974. This element has a capacity for twelve channels, with central wavelengths spaced about 1.5 nm apart in the band from 1545 to 1565 nm.

Figure 3:
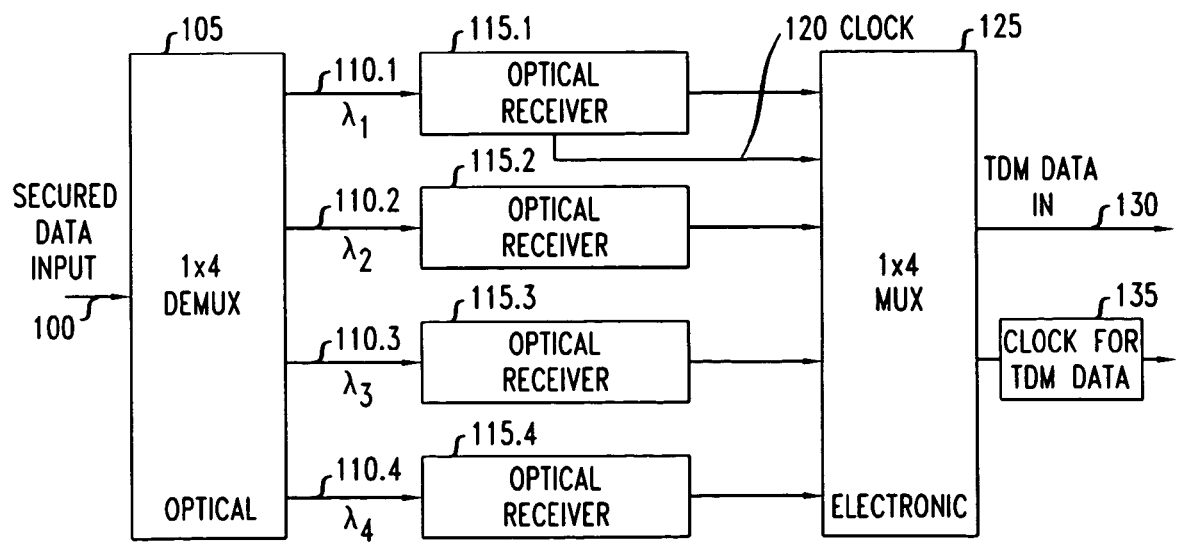
FIG. 3 is a conceptual block diagram of an illustrative receiver for receiving and decoding transmissions from the system of FIG. 2.

Turning to FIG. 3, received signal 100 is first processed by optical 1×4 demultiplexer 105 to produce optical signals 110.1-110.4 in respective individual wavelength channels identified by the wavelengths $\lambda_1$-$\lambda_4$. Each of these signals is converted to the electrical domain by a respective one of optical receivers 115.1-115.4. One of these receivers, identified in the figure as receiver 115.1 provides a timing signal 120 for electronic 1×4 multiplexer 125. The receiver not only converts the optical data signal to an electronic data signal, but it also generates an electronic clock signal. Multiplexer 125 receives respective electronic signals from each of the optical receivers, and multiplexes them into a single time-domain-multiplexed output data stream 130. Timing element 135 provides a corresponding clock signal.

In the optical approach to wavelength coding, optical time division multiplexing techniques are used to apportion an incoming optical stream of data into separate channels at different wavelengths. Wavelength division multiplexing techniques are then used to combine these channels into, e.g., a single optical fiber for transmission.

Figure 4:
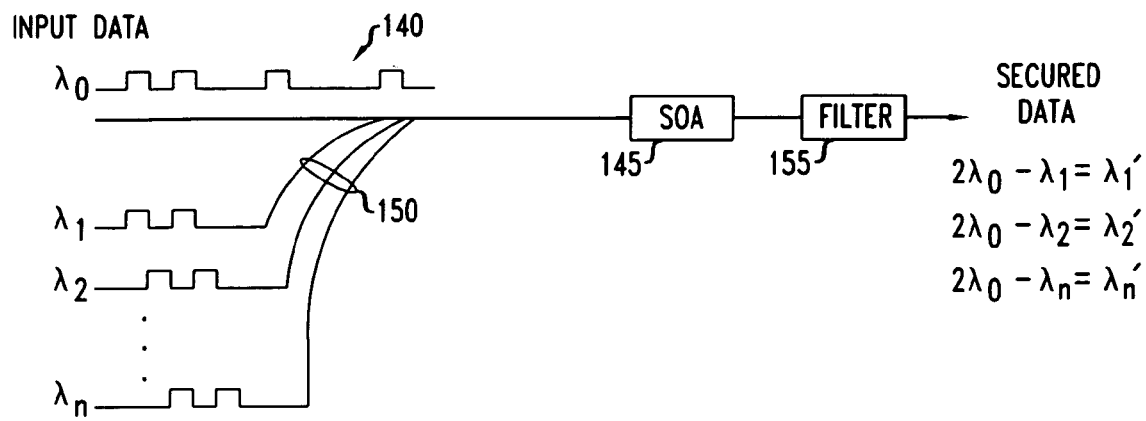
FIG. 4 is a conceptual block diagram of an optical wavelength-coding system according to the invention in one aspect.

FIG. 4 shows an example of such an approach. Data stream 140, carried by wavelength $\lambda_0$, contains the input data. Four-wave mixing, to be described below, is used to combine the data wavelength $\lambda_0$ with mixing wavelengths $\lambda_1$-$\lambda_n$ to provide n coding wavelengths for transmission.

One non-linear optical device suitable for four-wave mixing is a Semiconductor Optical Amplifier (SOA), shown as element 145 in FIG. 4. The physics and operation of semiconductor optical amplifiers are described, e.g., in an article by N. K. Dutta, M. S. Lin, A. B, Piccirilli, and R. L. Brown, in *J. Appl. Phys.* 67 (1990), 3943.

The mixing wavelengths are provided on inputs 150 to the SOA. In the SOA, wavelengths $\lambda_0$ and $\lambda_1$ are combined to produce output wavelength $\lambda_1'=2\lambda_0-\lambda_1$. Wavelength $\lambda_0$ is similarly mixed with each of wavelengths $\lambda_2$-$\lambda_n$ to produce the respective output wavelengths $\lambda_2', \lambda_3', \ldots, \lambda_n'$. To assure that only the coding wavelengths are transmitted, multiple band pass filter 155 is placed on the output of SOA 145.

According to standard methods of time division multiplexing, each of the output wavelength channels has an allocated, recurring time window. Each sequence of recurring windows, for a given output channel, corresponds to a train of pulses on one of the respective inputs 150. Accordingly, each bit of data in input stream 140 is mapped into a respective output channel according to the time window that is active when such bit reaches the SOA.

Figure 5:
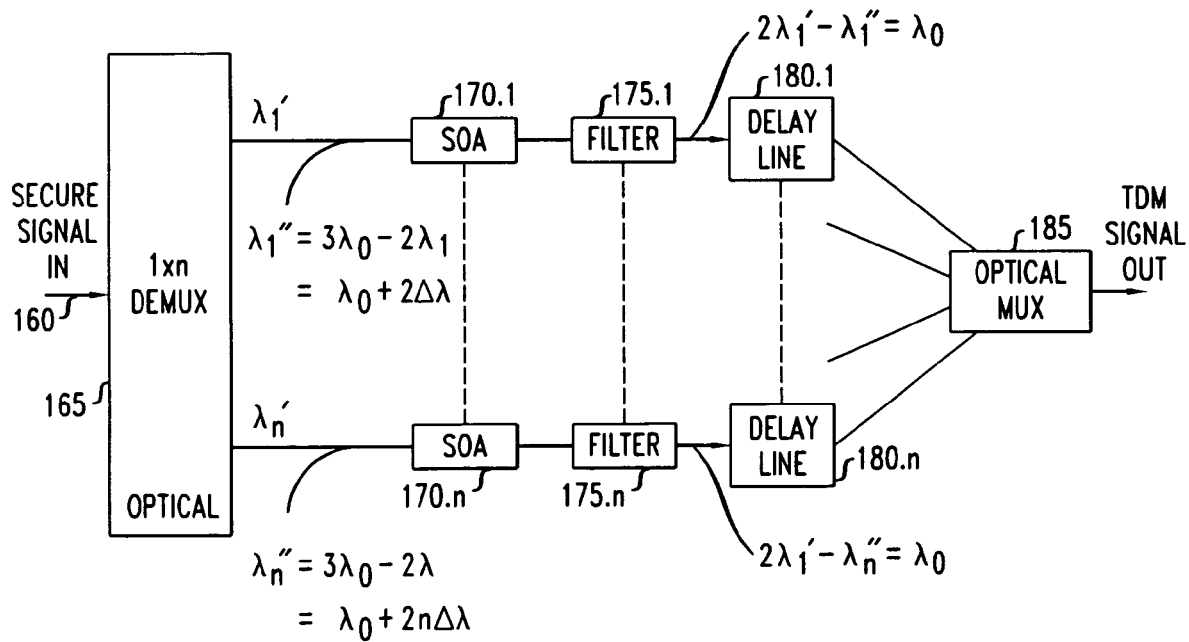
FIG. 5 is a conceptual block diagram of an illustrative receiver for receiving and decoding transmissions from the system of FIG. 4.

FIG. 5 shows an illustrative receiver for the optically coded signal. Incoming received signal 160 is separated by 1×n optical demultiplexer 165 into n signals in respective wavelength channels, each carried on one of wavelengths $\lambda_1', \lambda_2', \lambda_3', \ldots, \lambda_n'$. Each of these signals is combined in a respective SOA 170.1, ..., 170.n with a corresponding decoding wavelength $\lambda_1'', \lambda_2'', \lambda_3'', \ldots, \lambda_n''$ to recreate data wavelength $\lambda_0$ according to $2\lambda_1'-\lambda_1''=\lambda_0$, and similarly for the other pairs of similarly indexed transmitted wavelengths and decoding wavelengths. The value of the first decoding wavelength $\lambda_1''$ is given by $\lambda_1''=3\lambda_0-2\lambda_1$. Each of the other decoding wavelengths is similarly obtained from $\lambda_0$ and a corresponding transmitted wavelength.

Respective filters 175.1, ..., 175.n assure that only the decoded wavelength $\lambda_0$ is passed to subsequent processing stages. The relative timing of the respective portions of the original signal that were apportioned to different wavelength channels is restored by passing the wavelength-decoded portions through respective delay lines 180.1, ..., 180.n, and then these portions are recombined in optical combiner 185 to reconstruct the original signal 140 (see FIG. 4). In effect, the delay lines operate to reverse the previous WDM to TDM coding process.

One advantage of the optical approach to wavelength coding is that it can code signal channels having generally higher data rates than can the electronic approach. In fact, we currently believe that data at rates of 40 Gigabits per second, or even more, can be coded by this approach. Although four-wave mixing in an SOA has been described as one non-linear process useful in carrying out this approach, it is not the only such process. The invention should be understood to extend to other non-linear processes, such as gain or phase modulation in an optical device. Such devices include optical amplifiers and Mach-Zehnder modulators.

Figure 6:
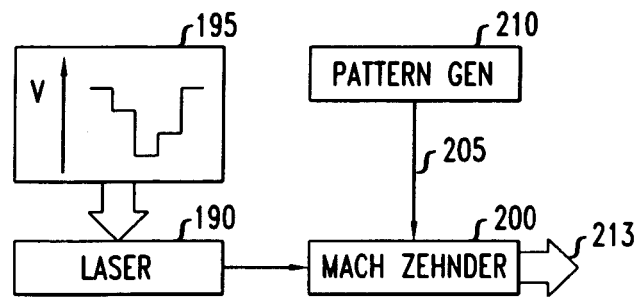
FIG. 6 is a conceptual block diagram of an electro-optical wavelength-coding system according to the invention in one aspect.

A system for implementing one example of an electro-optical approach to wavelength coding is depicted in FIG. 6. A broadband tunable laser 190 changes its output wavelength in response to a programmable input voltage pattern 195. By way of example, we have applied a four-level voltage pattern, varying from −2.5 V to −1.0 V, to a typical such laser. The laser responded with output in four respective wavelength channels, having central wavelengths separated by about 0.7 nm, and together spanning a wavelength range of about 1547.2 nm to about 1549.5 nm.

Lasers useful in this context are described in an article by T. L. Koch and U. Koren in *IEEE Journal of Quantum Elect. Vol QE*-27 (1991) 641, and have been made and demonstrated at Lucent Technologies, Bell Laboratories.

Lasers useful in this context are also described in U.S. patent application Ser. No. 08/954,305, filed by L. E. Adams et al. under the title "Broadband Tunable Semiconductor Laser Source," commonly assigned herewith, and in U.S. patent application Ser. No. 08/954,575, filed by L. E. Adams et al. under the title "Sub-Carrier Multiplexing in Broadband Optical Networks," commonly assigned herewith.

Voltage pattern 195 determines the time windows that are allocated to the respective output wavelength channels. Modulator 200, which is exemplarily a Mach-Zehnder modulator, imposes on the laser output the data that are present in electrical-domain input signal 205 generated by electronic signal source 210. The output 213 of modulator 200 is readily coupled into, e.g., an optical fiber (not shown) for transmission.

Figure 7:
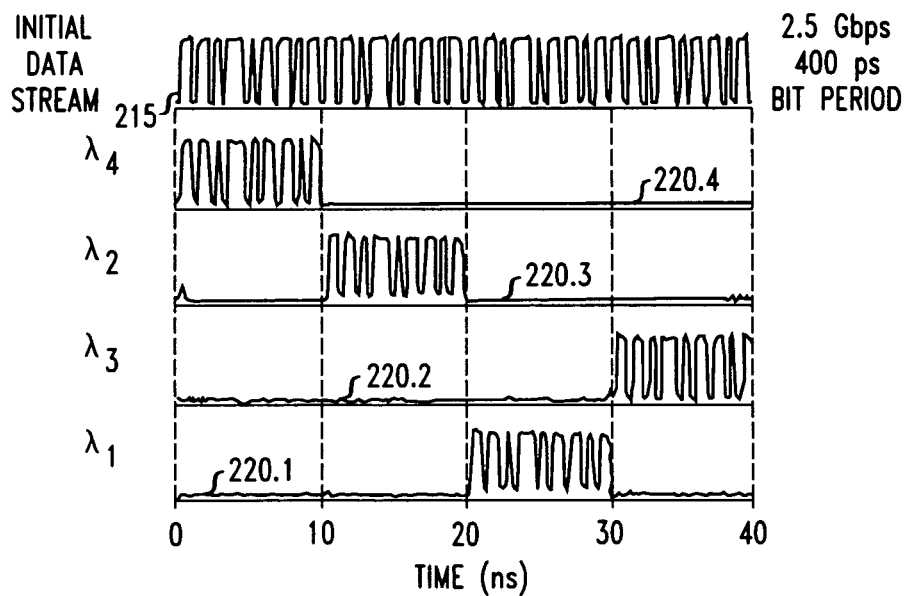
FIG. 7 is a set of oscillograms that were recorded in an experimental demonstration of the wavelength-coding technique of FIG. 6.

FIG. 7 is a set of oscillograms representing an experimental demonstration of this approach for wavelength coding of high-data-rate signals. Initial data stream 215 contained a pattern of 25 bits transmitted repeatedly, with no gaps, at a rate of 2.5 Gigabits per second. Each of traces 220.1-220.4 shows one of the modulated output channels from the broadband tunable laser. It is evident from the figure that the 25-bit pattern was reproduced faithfully in all channels. The absence of any perceivable time gap between the data packets in adjacent channels shows that the wavelength switching time was less than a single bit period.

In one alternative to the electro-optical wavelength-coding system of FIG. 6, the individual, fixed-wavelength lasers of an array are sequentially activated in accordance with a programmed pattern which determines the respective time windows. The combined output of the array is subjected to modulation in modulator 200, as shown in FIG. 6. Laser arrays useful in this regard are described, e.g., in U.S. Pat. No. 5,394,489, commonly assigned herewith, which issued on Feb. 28, 1995 to T. L. Koch under the title, "Wavelength Division Multiplexed Optical Communication Transmitters."

Figure 8:
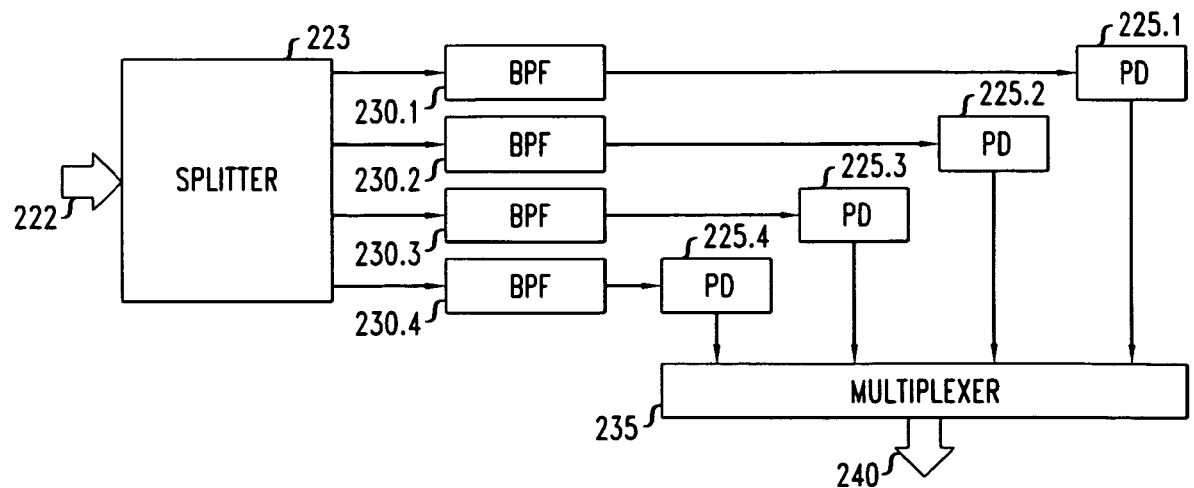
FIG. 8 is a conceptual block diagram of an illustrative receiver for receiving and decoding transmissions from the system of FIG. 6.

FIG. 8 depicts a system for receiving and decoding the wavelength coded signal. The incoming optical data stream 222 is distributed to respective reception channels by, e.g., splitter 223. Each channel has a respective photodetector 225.1-225.4 preceded by a tunable band pass filter 230.1-230.4 for excluding all signals but those on the intended wavelength. Standard electronic time-division multiplexing techniques, as illustrated, e.g. in FIG. 3 and as summarized by element 235 of FIG. 8, are readily used to assemble the photodetector outputs into single electronic output data stream 240.

As noted above with reference to FIG. 1, in all of the embodiments described above, the input data stream 10 is divided into portions 35.1-35.N, each of which is allocated to a respective one of N wavelength channels. Often, these N channels will be assembled into the transmitted optical signal 20 in such a way that the pulse sequence of input data stream 10 is preserved. That is, each pair of features that occur in a certain order in data stream 10 will be represented by features of data stream 20 that occur in the same order. This is achieved, e.g., by allocating a first feature to channel 1, the next to channel 2, and so forth up to channel N, and then repeating the same allocation pattern. When the N channels are assembled to form data stream 20, they are then assembled in the order 1, 2, . . . , N.

An extra measure of security can be added by scrambling the wavelength channels in such a way that the transmitted signal stream 20 does not preserve the original pulse sequence (or other sequence representing data content), but the receiver can recover the original pulse sequence from signal stream 20. This is achieved, e.g., by permuting the order of signal portions 35.1-35.N before they are combined in multiplexer 45, and in the receiver, applying the inverse permutation after the respective signal portions have been separated by demultiplexer 50.

Figure 9:
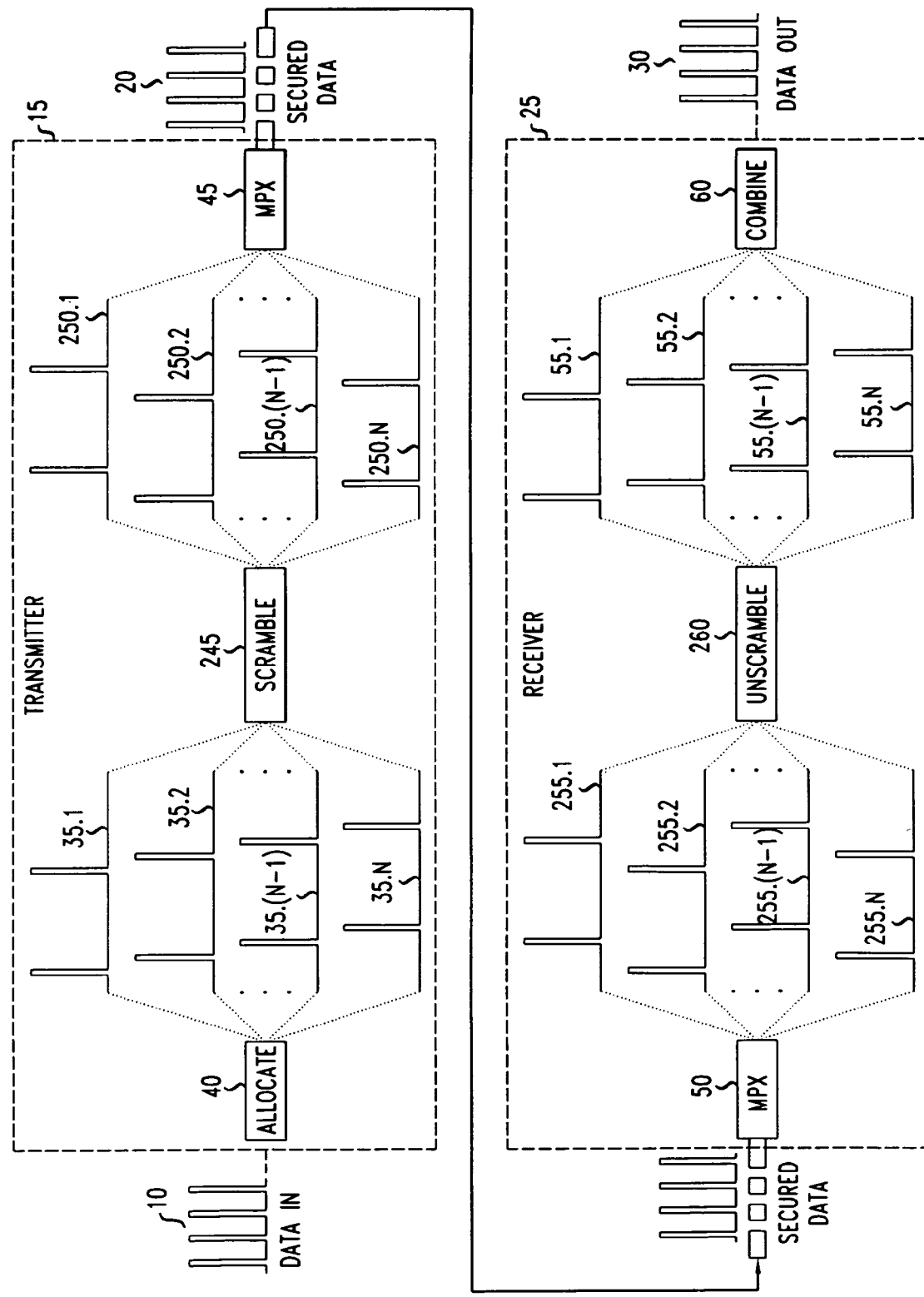
FIG. 9 is a conceptual block diagram of the system of FIG. 1, with the addition of features for scrambling and unscrambling signal channels. Similar reference numerals are used to denote corresponding features in FIGS. 1 and 9.

By way of illustration, FIG. 9 shows a functional element in the transmitter, represented by scrambler 245, which permutes signal portions 35.1-35.N to produce permuted signal portions 250.1-250.N. This is done, e.g., by using electronic or optical delay lines to change the relative sequence of the N channels, while preserving relative timing within each channel individually.

FIG. 9 also shows a functional element in the receiver, represented by unscrambler 260, which applies the inverse permutation to signal portions 255.1-255.N to produce signal portions 55.1-55.N, which can be combined to recover the original pulse sequence. The inverse permutation is also exemplarily carried out using electronic or optical delay lines.

The system of FIG. 9 may use a fixed permutation and inverse permutation. However, even greater security is afforded by using a variable permutation (and its inverse). The permutation may be varied according to a schedule known in advance by the transmitter and receiver.

To allow still greater security, however, the permutation may be varied at the transmitter, and identified at the receiver by header information that has been sent as part of transmitted signal 20. In such a case, signal portions 255.1-255.N will typically be held in a buffer while the header information is decoded, and then subjected to the inverse permutation in accordance with the decoded header information.

The invention claimed is:

1. A method for transmitting data content provided in a data signal, comprising:
   a) assigning distinct non-overlapping portions of the data signal to two or more respective channels;
   b) for each channel, using corresponding assigned portions of the data signal to modulate an optical carrier signal at a respective wavelength associated with that channel; and
   c) transmitting an optical output signal that comprises modulated carrier energy at each of the respective wavelengths, such that data content is carried, in the transmitted output optical signal, by energy at two or more of the respective wavelengths;
   wherein the assigned portions of the data signal each have the same bit rate as the data signal itself; and
   wherein assignment of the portions to the channels is implemented in a permuted manner which makes it difficult for an unauthorized user having no knowledge of the assignment to reconstruct the data signal from received portions thereof.

2. The method of claim 1, wherein the modulated carrier energy is transmitted in sequential segments, each such segment having a respective wavelength.

3. The method of claim 1, wherein the assigning step comprises assigning, to each channel, those portions of the data signal that coincide with a recurring time window allocated to that channel.

4. The method of claim 3, further comprising permuting the recurring time windows allocated to the channels, such that data content carried in the transmitted optical output signal occurs in a different sequence from the data content provided in the data signal.

5. The method of claim 4, wherein the permuting step is carried out using delay lines.

6. The method of claim 5 further comprising transmitting, as part of the optical output signal, information that describes how the time windows were permuted.

7. The method of claim 1, wherein the transmitting step comprises launching the optical output signal into an optical fiber.

8. The method of claim 1, wherein the transmitting step comprises launching the optical output signal into free space.

9. The method of claim 1, wherein:
a) the data signal is an electrical signal;
b) the assigning step comprises deriving two or more electrical driver signals from the data signal, each driver signal corresponding to a respective channel; and
c) the modulating step comprises using each driver signal to cause a respective optical emission device to emit an optical signal at a respective wavelength.

10. The method of claim 1, wherein the data signal is an optical signal having a wavelength $\lambda_D$, and the modulating step comprises:
a) providing optical radiation at two or more wavelengths to be referred to as coding wavelengths; and
b) mixing a respective portion of the data signal with optical radiation at each of the coding wavelengths in a nonlinear optical device, thereby to generate modulated radiation having a wavelength different from the wavelength $\lambda_D$ and the coding wavelengths.

11. The method of claim 10, wherein:
a) the assigning step comprises assigning, to each channel, those portions of the data signal that coincide with a recurring time window allocated to that channel;
b) the optical radiation at each of the coding wavelengths is provided in the form of a train of pulses;
c) each train of pulses corresponds to a recurring time window allocated to one of the channels; and
d) the respective wavelength associated with each of the channels is a wavelength of modulated radiation generated by said non-linear mixing.

12. The method of claim 1, wherein:
a) the data signal is an electrical signal;
b) the method further comprises operating a tunable light source to produce output radiation that varies stepwise in wavelength according to a pattern; and
c) the assigning and modulating steps comprise using the data signal to modulate the output radiation such that each portion of the data signal is modulated onto an assigned wavelength of output radiation.

13. The method of claim 12, wherein the output radiation is generated by operating a voltage-tunable laser.

14. The method of claim 12, wherein the pattern of wavelength variation defines respective, recurring time windows during which data content is to be allocated to corresponding wavelength channels.

15. A method of optical communication, comprising:
receiving an optical signal that contains energy in two or more distinct wavelength channels;
assembling portions of the received optical signal, from distinct wavelength channels, into a single sequential data stream; and
recovering data content from the assembled data stream;
wherein the portions of the received optical signal from the distinct wavelength channels are respective non-overlapping portions of the single sequential data stream with each such non-overlapping portion having the same bit rate as the single sequential data stream; and
wherein assignment of the portions to the channels is implemented in a permuted manner which makes it difficult for an unauthorized user having no knowledge of the assignment to assemble the single sequential data stream from said portions.

16. The method of claim 15, wherein:
a) the method further comprises providing timing information that defines a succession of time windows for each of the channels; and
b) the assembling of signal portions is carried out in accordance with the timing information, such that in the assembled data stream, each portion of the received optical signal falls in assigned time windows according to the channel in which such portion was received.

17. The method of claim 16, wherein the received optical signal falls in time windows having a permuted sequence, and the method further comprises applying an inverse permutation to the time windows, such that data content carried in the received optical signal is restored to an original sequence.

18. The method of claim 17, wherein the inverse permutation is carried out using delay lines.

19. The method of claim 18, further comprising decoding, from the received optical signal, information that describes how the time windows were permuted.

20. The method of claim 15, wherein:
a) the method further comprises optically demultiplexing the received signal, thereby to provide two or more single-channel optical signals;
b) the method further comprises detecting each of the single-channel signals, thereby to provide two or more single-channel electronic signals; and
c) the assembling step comprises electronically multiplexing the single-channel electronic signals.

21. The method of claim 15, wherein:
a) the method further comprises optically demultiplexing the received signal, thereby to provide two or more single-channel optical signals;
b) the method further comprises shifting each of the single-channel signals into a common wavelength channel by non-linear optical mixing; and
c) the assembling step is carried out by optical multiplexing.

22. An optical communication system, comprising:
a source of a data signal having data content;
a system operative to apportion the data content into two or more distinct wavelength channels according to defined time windows such that each said channel receives a portion of the data content during its assigned time windows; and
an output element operative to couple an output optical signal into a transmission medium, wherein said output optical signal contains portions of the data content in two or more wavelength channels;
wherein the portions of the data content are respective non-overlapping portions of the data signal each having the same bit rate as the data signal itself; and wherein assignment of the portions of the data content to the channels is implemented in a permuted manner which makes it difficult for an unauthorized user having no knowledge of the assignment to reconstruct the data signal from received portions of the data content.

23. The optical communication system of claim 22, further comprising a scrambling element operative to permute the time windows, such that data content carried in the optical output signal occurs in a different sequence from the data content provided in the data signal.

24. The optical communication system of claim 23, wherein the scrambling element comprises delay lines.

25. The optical communication system of claim 22, wherein:
the data signal source is an electronic signal source;
the apportioning system comprises an electronic demultiplexer operative in response to the data signal to generate two or more distinct driver signals;
the apportioning system further comprises a respective optically emissive device operative in response to each driver signal to generate a corresponding optical signal in a distinct wavelength channel; and
the output element comprises an optical multiplexer operative to combine the respective optical signals and couple them into the transmission medium.

26. The optical communication system of claim 22, wherein:
the data signal source is an optical signal source; and
the apportioning system comprises a nonlinear optical device operative to shift selected portions of the data signal into respective wavelength channels.

27. The optical communication system of claim 22, wherein:
the data signal source is an electrical signal source;
the apportioning system comprises a voltage-tunable laser operative, in response to a voltage pattern, to emit radiation that, in respective time windows, occupies corresponding wavelength channels; and
the apportioning system further comprises a modulator, operative in response to the data signal to impose data content on the radiation emitted by the voltage-tunable laser.

28. An optical communication system, comprising:
a device operative to receive an input optical signal that contains data content in two or more distinct wavelength channels, and operative to separate portions of said input signal according to wavelength; and
a device operative to assemble said portions into a single, sequential data stream;
wherein the separated portions are non-overlapping portions of the single, sequential data stream each having the same bit rate as the single, sequential data stream; and
wherein assignment of the portions to the channels is implemented in a permuted manner which makes it difficult for an unauthorized user having no knowledge of the assignment to reconstruct the single, sequential data signal from the separated portions.

29. The optical communication system of claim 28, wherein: each wavelength channel is received in a respective recurring time window, the time windows are permuted such that data content is received in a sequence that differs from an original sequence, and the system further comprises an unscrambling element operative to permute the time windows, such that assembly of the portions into a single, sequential data stream will cause data content to occur in the original sequence.

30. The optical communication system of claim 28, wherein the unscrambling element comprises delay lines.

31. The optical communication system of claim 28, wherein:
the signal-receiving and separating device is an optical demultiplexer;
the optical communication system further comprises two or more optical receivers, each operative to convert optical signal portions in a respective wavelength channel to corresponding electrical signal portions; and
the assembling device comprises an electronic multiplexer in receiving relationship to said electrical signal portions.

32. The optical communication system of claim 28, wherein:
the signal-receiving and separating device is an optical demultiplexer;
the optical communication system further comprises two or more nonlinear optical devices, each operative to shift optical signal portions in a respective wavelength channel into a common wavelength channel; and
the assembling device comprises an optical multiplexer in receiving relationship to the optically shifted signal portions.

* * * * *